United States Patent [19]
Martin

[11] 3,999,908
[45] Dec. 28, 1976

[54] CANTILEVER APPARATUS FOR MOLDING PIPES

[76] Inventor: Norman Albert Martin, 9 Agnes St., Nobel Park, Victoria, Australia

[22] Filed: Apr. 28, 1975

[21] Appl. No.: 572,069

Related U.S. Application Data

[63] Continuation-in-part of Ser. No. 387,955, Aug. 13, 1973, abandoned.

[52] U.S. Cl. .................................. 425/59; 425/64
[51] Int. Cl.² ........................................ B28B 13/02
[58] Field of Search .................. 425/59, 62–65; 264/33–34

[56] References Cited

UNITED STATES PATENTS

| | | | |
|---|---|---|---|
| 2,264,054 | 11/1941 | Sarosdy | 264/33 |
| 2,731,698 | 1/1956 | Tunsen | 425/59 |
| 3,106,760 | 10/1963 | Tunsen | 425/59 |
| 3,113,364 | 12/1963 | Blixt | 425/59 |
| 3,123,883 | 3/1964 | Peirsol et al. | 425/59 |
| 3,205,550 | 9/1965 | Martin | 425/59 |
| 3,551,537 | 12/1970 | Thomason | 425/59 |
| 3,562,056 | 2/1971 | Olson | 264/33 |

FOREIGN PATENTS OR APPLICATIONS

| | | | |
|---|---|---|---|
| 924,943 | 5/1963 | United Kingdom | 425/59 |

Primary Examiner—Francis S. Husar
Assistant Examiner—John McQuade
Attorney, Agent, or Firm—Graybeal, Barnard & Uhlir

[57] ABSTRACT

The invention is concerned with in situ moulding of concrete pipelines and comprises apparatus having a moulding unit which is movably supported on pre-placed support units by a cantilever beam. The moulding unit includes an inner mould former which corresponds to the internal cross sectional shape of the pipe to be formed and having an upper inner portion and a lower inner portion, and an outer mould former which extends over the top and upper side portions of the upper inner mould former in spaced relationship to define a mould cavity within which the top and upper side portions of the wall of the pipe is formed. The underside of the outer mould former is open so as to expose the mould cavity to the base of the trench within which the pipeline is being formed. A method for using the apparatus includes the steps of locating the trackway in a trench, moving the moulding unit along the trackway, and simultaneously pouring a concrete slurry into said mould cavity.

17 Claims, 14 Drawing Figures

CANTILEVER APPARATUS FOR MOLDING PIPES

CROSS-REFERENCE TO RELATED APPLICATION

This is a continuation-in-part of my copending application Ser. No. 387,955, filed Aug. 13, 1973, now abandoned, and entitled "Moulding of Concrete Pipes and the Like In Situ."

BACKGROUND OF THE INVENTION

1. Field of the Invention

This invention relates, in general, to the moulding of pipes and the like in situ, and in particular, to the continuous moulding of concrete pipes which are suitable for the gravity flow of liquids in a preformed trench.

2. Description of the Prior Art

Hitherto, in the forming of pipes or conduit in situ it has been considered necessary to take great care in digging the trench in the ground in which the pipe is to be moulded for the reason that this trench determines the direction or line of the pipe to be moulded and in addition the bottom of the trench determines the fall of the pipe which must be sufficient to ensure the desired gravity flow of the fluid therethrough. The pipe is subsequently moulded in such a trench by the use of mould formers in suitable lengths determined by the ability of the laborers to handle the formers employed. Portions of the formers must remain in position until the section has set before being removed and re-assembled for forming a further pipe section.

U.S. Pat. Nos. 2,731,698 and 3,106,760 and Great Britain Pat. No. 924,943 all disclose apparatus for forming concrete pipe in situ. None of these patents disclose apparatus allowing formation of pipe without accurately forming the bottom portion of the trench to provide the line and fall of the completed pipe. U.S. Pat. No. 3,562,056 likewise requires accurate trench formation and is further aimed primarily at the formation of pipe having a plastic lining. U.S. Pat. No. 2,264,254 discloses a method and apparatus for handling tunnel lining forms.

BRIEF SUMMARY OF THE INVENTION

The primary object of the present invention is to provide improved apparatus for moulding concrete pipes or the like in situ, either below or above ground level, the apparatus employed being of relatively simple and inexpensive construction and adapted to form the pipe in a continuous moulding operation which results in a material saving in time and cost of production.

Furthermore, the improved apparatus may be quickly and easily mounted in its operative position with the desired accuracy.

In accordance with the present invention the improved apparatus includes improvements relating to the moulding of a continuous concrete or like pipeline or channel in situ which comprises partly forming the line and fall of the path to be followed by the pipeline, positioning supporting means along said path, testing said supporting means and where necessary adjusting the effective height thereof so that it follows the desired line and fall of the pipeline to be formed, mounting a movable moulding unit upon said supporting means, feeding concrete or like slurry to said moulding unit and moving the latter lengthwise of said supporting means so as progressively to form said pipeline.

As a matter of convenience, the invention will be defined in the appended claims as related to in situ moulding of conduit, and the word "conduit" is to be understood as embracing both pipelines and open top channels. In the following detailed description however, the invention is particularly described in relation to moulding of a pipeline, the interior of which is circular in transverse cross-section.

Other advantages and various novel features of the invention will be more readily apparent from the following more detailed description of a practical embodiment in which a conduit is moulded in a trench below ground level.

DESCRIPTION OF THE PREFERRED EMBODIMENT

In accordance with the embodiment shown in FIGS. 1–4, the improved moulding apparatus includes guideway means shown in the form of a rail or trackway 2 and means 3 for supporting it so that the rail extends lengthwise in a trench 4 which may be formed mechanically or otherwise so as to extend in the desired direction. However, as long as the bottom of the trench substantially corresponds to the desired fall of the pipeline to be formed, the usual care need not be exercised in the formation of the bottom portion of the trench.

Figures 1, 2, 3, 4:
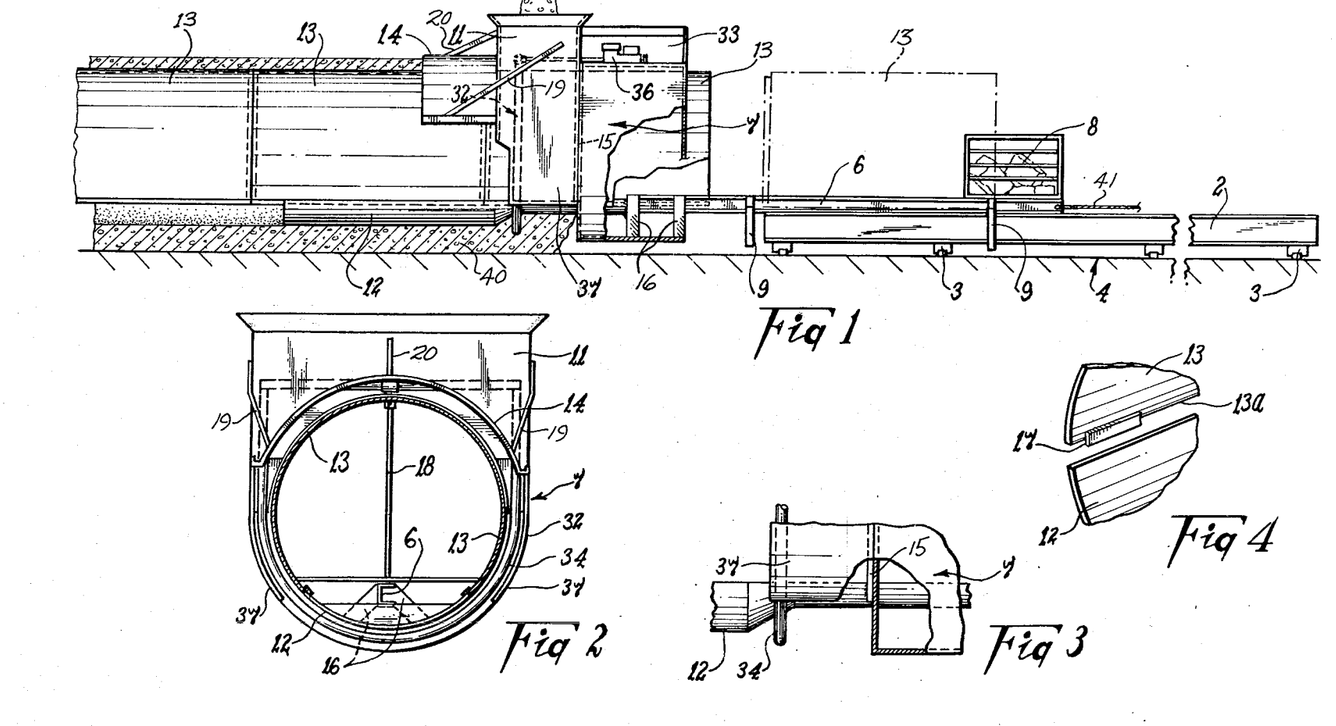
FIG. 1 is a semi-diagrammatic side elevation of apparatus in accordance with one embodiment of the invention for moulding concrete or like pipes in situ and in which the movable moulding unit is shown moved partway along a length of stationary mould section, a second mould section being shown in broken line forward of said moulding unit.
FIG. 2 is an end view, on an enlarged scale, looking at the left-hand end of the parts seen in FIG. 1.
FIG. 3 is a fragmentary side elevation, on an enlarged scale of a portion of the apparatus of FIG. 1.
FIG. 4 is a fragmentary exploded, perspective view showing means in accordance with one embodiment of the invention for effecting cooperation between upper and lower inner mould formers.

Rail 2 is intended to remain stationary in advance of the pipeline, whilst the latter is being formed in the trench. The aforesaid supporting means 3 are capable of being readily removed from their operative position and re-erected along a further portion of the trench after each section of the pipeline has been moulded. The height of the top portions of supporting means 3 above the bottom of trench 4 may be controlled such as by setting the supporting means in holes or mounds formed in or on the bottom of trench 4 or by providing the supporting means themselves with a height adjustment capability.

It should be appreciated that the positioning of rail or trackway 2 on the bottom of trench 4 determines both the line and fall of the pipeline, and consequently is the only component which must be accurately set up in the required operative position. Rail or trackway 2 defines what may be termed a guide path which corresponds to the desired line and fall of the conduit. For example, the mounting of the rail or trackway may be very accurately determined by the use of a theodolite or any other similar type of instrument.

Associated with the rail or trackway is a movable cantilever beam 6 which extends lengthwise of the trackway and initially overhangs the rail 2 at its rearward end where the pipeline is being formed.

The cantilever beam 6 is movable lengthwise of the rail and is secured at its rearward end remote from the rail to a movable moulding unit 7, the weight of which is preferably counter-balanced by a balance weight 8 on the movable beam 6 and which serves a particularly useful purpose when the movable beam and the parts carried thereby are overhanging the end of the rail or trackway.

Locating members 9 carried by the cantilever beam may depend at opposite sides of the rail in order to prevent undesirable lateral displacement of the beam. These locating members may also be fitted with rollers (not shown) adapted to track along the top and/or bottom or sides of the rail.

The unitary movable moulding unit 7 includes a hopper 11 interconnected with a lower inner mould former 12 and an upper outer mould former 14, the latter being spaced above a stationary upper inner mould former 13 a distance equal to the desired thickness of the upper portion of the pipe wall. During moulding, upper inner mould former 13 rests upon lower inner mould former 12 and in this manner the spacing between formers 13 and 14 is maintained constant.

The cantilever beam 6 is connected to unit 7 in any appropriate manner such as by welding or bolting to members 16 so that, in operation, the beam 6 and unit 7 move together relative to rail 2 and stationary upper inner mould former 13. In the illustrated embodiment, beam 6 is secured to mould former 12 through a series of diverging legs 16 depending from beam 6. Lower inner mould former 12, in turn, is secured on both sides to vertical braces 15 which are mounted to the inner surfaces of hopper 11's sides. Mould former 14 is secured to the face of hopper 11 and may be supported by braces 19, 20, thus making a unitary structure 7 from formers 12 and 14 and hopper 11. In this manner, the unit 7 moves along a series of stationary, end-to-end abutting upper inner mould sections 13 which cooperate with former 12, as described in more detail below, to form the entire inner surface of a conduit with the outer former 14 spaced above the opposed surface of section 13 according to the desired thickness of the pipe wall. In the illustrated embodiment, the apparatus is arranged to form a conduit having a circular internal cross-sectional shape, so that formers 12 and 14 and section 13 are of part circular formation.

In the embodiment of FIG. 1, the upper inner mould section or former 13 while separate from the lower inner mould former 12 is adapted to be slidably fitted to the upper side edges of the latter so that lateral displacement is prevented, such as by stops or shoulders 17 as seen in FIG. 4. Most important, however, is the slidable feature. The lower edge portions of the upper former 13 are slidably supported by the lower former 12 to fix the wall thickness defined by the opposed surfaces of formers 13 and 14, and to also facilitate movement of the unit 7 longitudinally with respect to stationary former 13. This can be achieved as shown in FIG. 4 or in any other manner, such as by providing rollers along each inner side of former 12 which may engage the lower edges of former 13 or shoulders 17 as will be described more completely with respect to the embodiments of FIGS. 5 and 11. The upper inner mould former 13 is preferably held in the desired shape by suitable interior bracing, such as a plurality of "Ts" or any other suitable types of cross ties or struts 18.

The upper outer mould former 14, as described above, is carried by the hopper 11 as in FIGS. 1 and 2 so that wet concrete slurry 40 gravitating from the hopper may flow over the stationary upper inner mould former 13 and between the latter and the side walls of the trench, as well as beneath the lower inner mould former 12 and between the latter and the bottom of the trench.

In use, after the trench has been dug so as to extend in the desired direction, and at approximately the desired depth, the rail or trackway 2 is mounted upon its supporting means 3 above the bottom of the trench and the line and fall of this rail or trackway carefully checked by means of a theodolite or in any other suitable manner.

The movable beam 6 and the components carried thereby are then mounted on the stationary rail or trackway 2 and moved lengthwise along the latter until its moulding unit 7 overhangs one end of the rail over a predetermined length of the trench along which it is desired to form part of the pipeline. Sections of stationary formers 13 may then be placed end-to-end along this predetermined length of trench ahead of unit 7, preferably for substantially the same length as beam 6, or they may be positioned one at a time as described below.

Concrete slurry 40 is then poured into the hopper from which it gravitates over the upper and lower inner mould formers until it fills the spaces between the latter and the bottom and opposite side walls of the trench as well as forming a covering over the top of the upper inner mould former 13 beneath former 14.

After or during such pouring of the concrete slurry. the movable beam 6 and the moulding unit 7 carried thereby are moved lengthwise along the stationary rail 2 toward the opposite end thereof. During such movement the lower inner mould former 12 functions as a slip mould to spread, compact and finish the inner surface of the bottom and part of the opposite side walls of the pipeline. Movement of the beam 6 and unit 7 may be effected in any suitable manner, such as by a movable winch located forwardly of beam 6 and connected thereto by a cable 41. In some cases, the pressure applied by the material fed into the hopper 11 causes automatic extrusion such that the unit 7 and beam 6 are moved forwardly by the reaction of that extrusion.

Likewise during the movement of moulding unit 7, the upper outer mould former 14 serves to spread, compact and finally finish the outer surface of the poured concrete which is intended to form the top and upper portions of the side walls of the pipeline. The inner surface of the top and upper portions of the side wall are formed by the stationary inner section or former 13.

After the movable beam 6 has been moved its operable distance along the stationary rail 2 it may pass over onto another coaligned section of the rail or trackway which has been mounted on the bottom of trench 4 to define the desired line and fall of the conduit to be poured, thus allowing the first mentioned section to be removed and re-erected in the desired operative position forward of the second rail section for further use. Similary, the previously used stationary formers 13 may be moved endwise out of the already formed conduit and placed in proper position for the next run, or alternatively further sections 13 may be added to the end of the previously used former section if the formed conduit needs to remain supported for some time during drying of the concrete slurry. By this arrangement a highly serviceable concrete pipeline may be formed in situ in less time than hitherto and in a most simple and inexpensive manner.

Referring now to FIGS. 5–8, a second embodiment of the invention is disclosed wherein rail or trackway 2 is replaced by series of supporting and guide units 21 and 26 which are spaced longitudinally along the trench or path along which the pipe is to be formed. Supporting units 21 are shown as being positioned on support means 38 in FIG. 5.

Figures 5, 6, 7, 8:
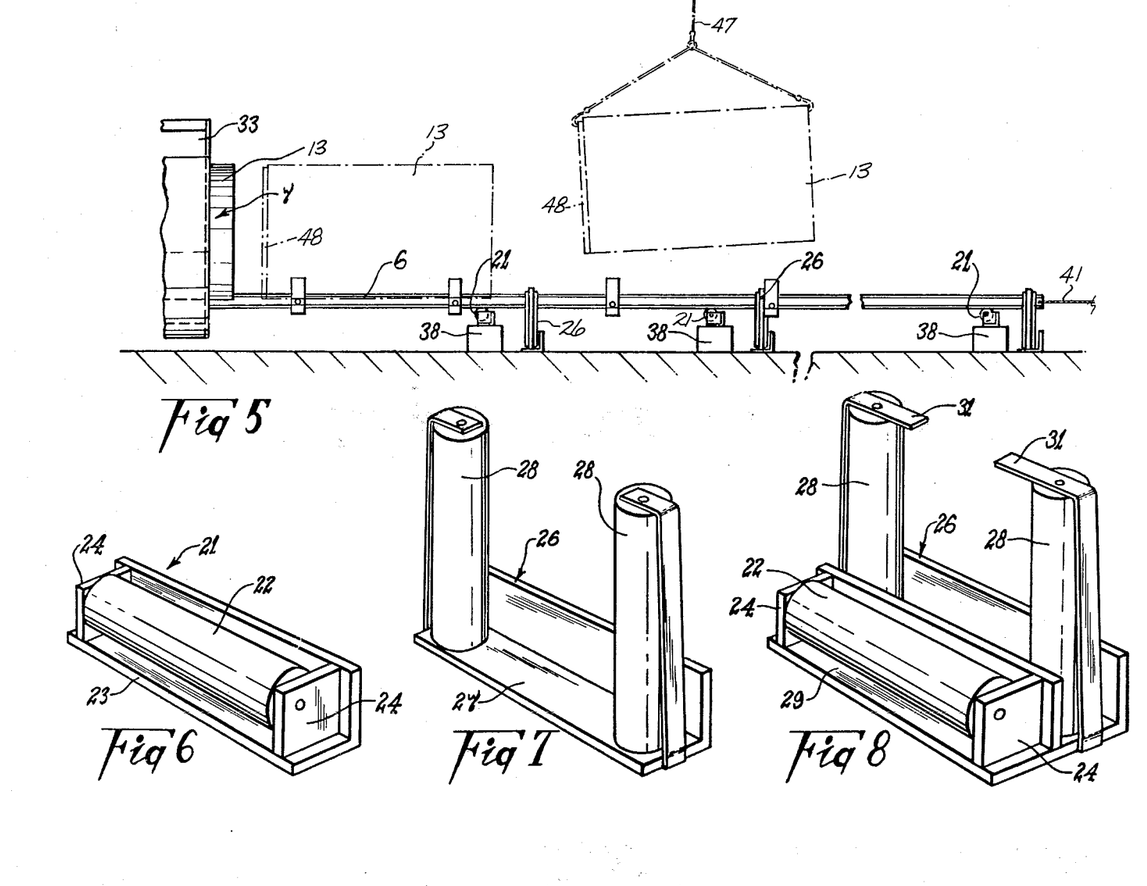
FIG. 5 is a semi-diagrammatic partial side elevation of a modified form of the invention including upper inner mould formers shown in broken line being positioned forward of said moulding unit.
FIG. 6 is a perspective view, on an enlarged scale, of one of the series of supporting units seen in FIG. 5.
FIG. 7 is a perspective view, on an enlarged scale, of one of a series of guide units seen in FIG. 5.
FIG. 8 is a perspective view, on an enlarged scale, of a further modification in which the supporting and guide members are combined to form a single unit.

Each supporting unit includes a roller 22 and mounting means therefor, the roller extending transversely of the trench or path of the pipe so as to be located in a substantially horizontal plane.

The mounting means for each roller may consist of a base member 23 provided with opposed bearings 24 in which the roller is journaled in any suitable manner.

Associated with the supporting units are guide units for opposing undesirable lateral movement of the cantilever beam 6 and the moulding unit 7 carried thereby, whilst the beam and moulding unit is being moved lengthwise, for example, of the trench during the pipe moulding operations.

Referring to FIG. 7, a typical guide unit 26 is disclosed including a base member 27 carrying a pair of upstanding and substantially parallel rollers 28 which are laterally spaced so as to permit the aforesaid cantilever beam 6 to pass freely therebetween without any material sideward movement.

It will be appreciated that when in use the series of supporting units 21 and guide units 26 are operatively positioned and adjusted so that the rollers 22 on the supporting units are aligned at the desired inclination to the horizontal so as to provide the desired slope in the bottom of the pipe after it has been formed.

The guide units 26 are also arranged in alignment both to guide the cantilever beam over the supporting rollers whilst opposing undesirable sideward movement thereof and to maintain the desired line of the pipe within the trench.

It will be appreciated from the foregoing that although it is preferred to employ separate supporting and guide units as aforesaid, each supporting roller 22 and a pair of laterally spaced guide rollers 28 may, if desired, be mounted on a common base member 29 so as to provide a single unit as shown in FIG. 8.

Furthermore, retaining means may be provided for preventing undesirable upward movement of the free end of the cantilever beam, particularly whilst it is occupying its maximum operative position rearward of the supporting unit nearest to the newly formed pipe. Such retaining means may consist of one or more arms 31 carried by any one of the aforesaid units so as to overhang a portion of the cantilever beam for rolling or sliding engagement therewith.

Figure 9:
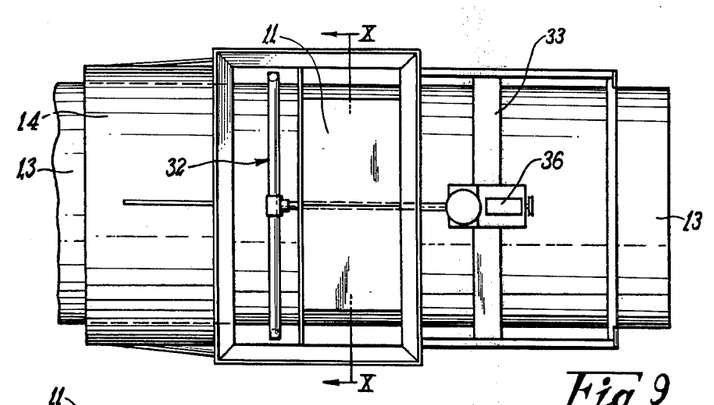
FIG. 9 is a plan view, on an enlarged scale, of the hopper seen in FIGS. 1 and 2 showing vibrator means associated therewith.
Figure 10:
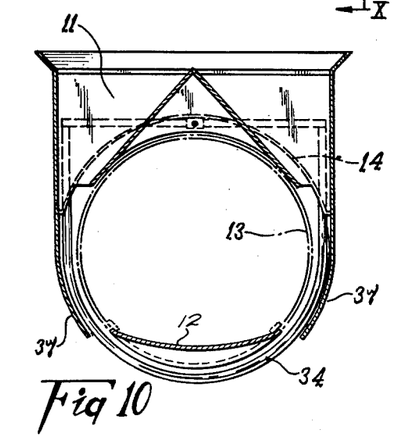
FIG. 10 is a cross-section view taken substantially along line X—X of FIG. 9 and showing the hopper, the vibrator and other components associated therewith in accordance with the embodiment shown in FIG. 9.

Referring to FIG. 9, any suitable type of vibrator means may be employed for agitating and compacting the wet concrete whilst it is being poured. For example, the vibrator 32 may be carried by a cradle 33 associated with the hopper 11 and be fitted with one or more rings 34 located in the pipe moulding space. Any suitable type of pneumatic, electrical or mechanical driving means 36 may be employed for vibrating these rings in accordance with requirements.

The mould 12 which is adapted to form the inner surface of the lower portion of the pipe and the mould 14 which is interconnected with mould 12 and adapted to form the top or outer surface of the upper portion of the pipe are both adapted to function as slip moulds when the unit 7 is drawn longitudinally along the trench as each portion of the pipe is completed.

Figures 11, 12, 13, 14:
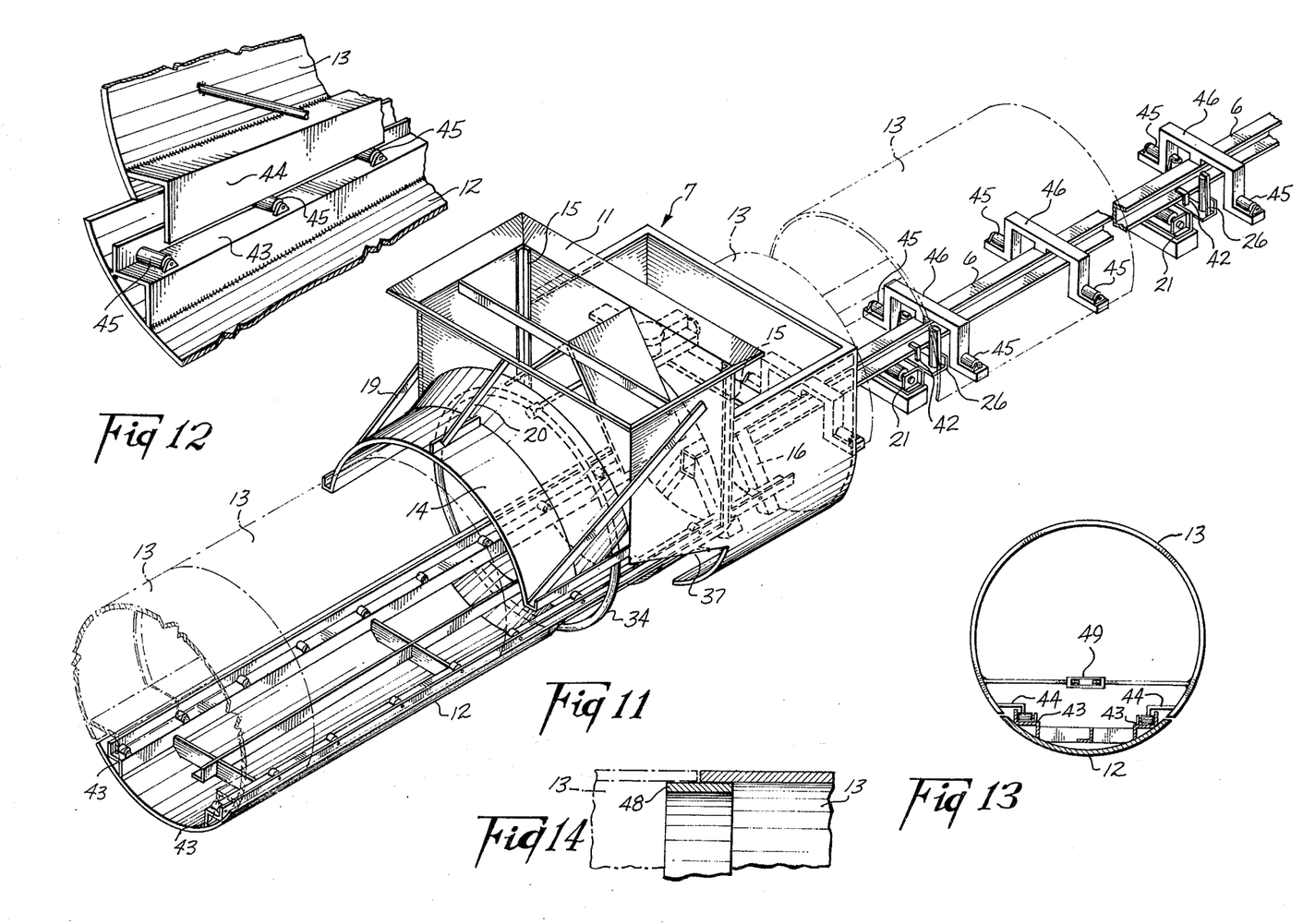
FIG. 11 is a perspective view of a typical apparatus made in accordance with this invention and shown in part in FIG. 5.
FIG. 12 is a partial perspective view of a typical connection between the upper inner mould former and the lower inner mould former portion of the moulding unit.
FIG. 13 is an elevation view of the interconnected upper inner and lower inner mould former members.
FIG. 14 is a partial sectional view showing a typical junction point between two adjacent upper inner mould formers.

Referring now to FIG. 11, a moulding unit 7 is disclosed in its operative position encircling a plurality of interconnected upper inner mould formers 13. Cantilever beam 6 extends forwardly from mould former 7 and is interconnected therewith by any conventional means such as support beams 16.

Cantilever beam 6 runs over support units 21 and between guide units 26 spaced forwardly of moulding unit 7, which units function in the manner earlier discussed with respect to FIGS. 5–7. Hold down flanges 42 are shown associated with guide units 26, but it will be understood that hold down flanges of any other suitable form may be associated with either units 21 or 26 to perform the function of preventing upward tilting of the cantilever beam.

In the embodiment of FIG. 11, a pair of rollered trackways 43 are shown mounted within lower inner mould former 12 adapted to rollingly cooperate with flanges 44 to support upper inner mould former 13 on the lower inner mould former 12. Referring particularly to FIG. 12, this structure is disclosed in detail and it will be understood that during the moulding operation as moulding unit 7 is pulled forwardly within the trench in which the conduit is to be formed, rollers 45 will allow former 12 to move from beneath the stationary mould formers 13.

Forward of roller trackway 43 on lower inner mould former 12 upper inner mould formers 13 are supported on transverse support members 46 mounted on beam 6. Members 46 include transverse arms on which rollers 45 are mounted which bear against and support flanges 44 on the inside of member 13 as shown more clearly in FIG. 13.

Referring also to FIG. 5, it will be understood that upper inner mould formers 13 may be mounted on support members 46 forward of moulding unit 7 through the use of a crane 47 or the like or in any other conventional means. Once mounted on rollers 46 members 13 may be rolled into endwise engagement with each other to form a continuous stationary upper inner mould over which moulding unit 7 is then moved.

Referring to FIG. 14, it will be seen that mould formers 13 may be provided with an inner lip 48 adapted to slide within the end of the next adjacent mould former 13 both to maintain adjacent mould formers 13 in alignment with each other and to prevent the concrete slurry from flowing between adjacent formers 13 into the conduit to be formed.

After moulding unit 7 has been moved longitudinally over a section of mould former 13 and concrete slurry poured to form a portion of the continuous pipe, the stationary upper inner mould formers 13 remain within each newly formed pipe section until the upper portion of the pipe has set sufficiently to permit the inner mould formers 13 to be safely manually removed therefrom.

Upper inner mould former 13 is preferably of a resilient of flexible nature so that its outer dimension can be reduced to facilitate removal from a formed and set section of conduit. For that purpose, any means, such as a turnbuckle 49 (FIG. 13), may be provided in each lateral support member to permit the length of that member to be reduced so that the sides of the former 13 can be drawn inwards to be freed from the set conduit.

In order to prevent undesirable spreading of the concrete during pouring, the hopper 11 is preferably provided with downwardly extending side walls 37 at that end of the hopper remote from the end of the cantilever beam. These side walls preferably depend below the upper edges of the lower slip mould 12.

Although the use of a rail or trackway 2 as aforesaid is quite satisfactory for the formation of a straight pipe, it will be appreciated that the use of a series of separate support and guide units 21 and 26 provides material advantages in that they are more easily handled and located in the desired operative positions, particularly if it is necessary for the pipe to follow a curved path.

If it is preferred in some cases to employ a rail or trackway as aforesaid, the associated cantilever beam may be adapted to slide lengthwise thereover or rollers may be employed to reduce undesirable friction during such movement. For example, the forward end of the rail may be provided with a transverse roller and the rear end of the cantilever beam may also be provided with a roller. The latter roller may be carried by a hanger fixed to and depending from the cantilever beam so that its roller may track along the bottom of the rail and thus oppose undesirable upward movement of the adjacent end portion of the cantilever beam.

Although generally concrete pipelines are formed in a trench below ground level in the manner described above, it will be appreciated that the use of the invention is not limited thereto, but that the improved apparatus may be employed if so desired for moulding in a similar manner a pipeline above ground level. In this case the surface of the ground along which the pipe is intended to extend, may be roughly formed by any suitable means to provide the approximate line and fall of the pipeline. However, owing to the absence of the opposite side walls of the aforesaid trench it is necessary to provide upstanding side walls spaced outwardly in relation to the lateral side portions of the upper and lower inner mould formers 13, 12 according to the thickness of the pipe to be formed. These additional side wall formers may be carried by the movable moulding unit 7 or in any other suitable manner and are adapted to function in the same manner as the aforesaid upper inner and outer mould formers.

Through the use of the present invention the usual operations required to accurately line up the inner and outer mould formers of each pipeline section in accordance with existing trade practice is no longer necessary as it will be apparent that careful attention to setting up the operative position of the stationary rail or trackway 2, or the series of supporting units 21 accurately determines both the line and fall of each pipeline section as it is being formed.

Although the present invention is particularly adapted for use in the moulding of concrete pipelines for the gravity flow therethrough of various liquids, it will be obvious that the invention is not limited thereto, but that it may be readily employed for the formation of concrete and like cementitious pipelines for the passage of various types of gases as well as liquids which need not necessarily flow by gravity through the pipeline.

Although it has been convenient to describe the application of the invention to the formation of a continuous pipeline of substantially circular form in cross section, it will be obvious that the invention is not limited thereto, but that it may be readily adapted to form pipelines or conduits of any other desired shape in cross section. Furthermore, it will be apparent that the invention is equally applicable to the formation of an aquaduct or other open topped channel for conveying water and other liquids.

Although such pipelines and other channels are normally made from concrete or like cemetitious material, it will be readily apparent to persons skilled in the art that the invention is also equally applicable to the formation of pipelines or channels from bituminous, plastic or other suitable material which is capable of being poured or otherwise moulded into the desired shape whilst the continuous pipelines or channel is being formed.

Various other modifications, alterations and/or additions may be introduced into the foregoing without departing from the ambit of the invention as defined by the appended claims.

What is claimed is:

1. Apparatus for moulding a continuous conduit in situ along a predetermined ground path without having to first accurately grade the ground path in order to establish the desired line and fall of the conduit, comprising:
    guideway means positionable on the ground along said ground path to establish a guide path corresponding to the desired line and fall of the conduit;
    elongated beam means movable endwise along said guide path and having a forward portion in engagement with said guideway means and a rearward portion which projects rearwardly from said guideway means in cantilever fashion over the ground path; and
    moulding means mounted on the cantilevered rearward portion of said beam means, comprising hopper means for receiving mouldable material operatively connected to means for directing such material onto the ground path and for moulding it into the desired shape of the conduit.

2. The apparatus according to claim 1, wherein said guideway means includes a plurality of lower support units spaced along said predetermined ground path, and together defining a lower boundary of the guide path.

3. The apparatus according to claim 2, wherein each of said lower support units includes mounting means with freely rotatable roller means secured thereto, said roller means being directed transversely of said guide path.

4. The apparatus according to claim 3, wherein said guideway means further includes a plurality of guide units spaced along said predetermined path for guiding said beam means laterally, each of said guide units including upstanding guide members for lateral contact with said beam means.

5. The apparatus according to claim 4, wherein at least some of said guide units includes a base member and a pair of upstanding, substantially parallel rollers, said rollers being laterally spaced apart to permit said beam means to pass therebetween without any material lateral movement.

6. The apparatus according to claim 5, wherein at least some of said guide units include retaining means for preventing upward movement of the forward portion of said beam means.

7. The apparatus according to claim 5, wherein each said support unit has a common base member with one of said guide units.

8. The apparatus according to claim 1, wherein said moulding means comprises:
   a moulding unit having a lower inner mould former means and an upper outer mould former means being connected to move together and slidably compact and finish the lower inner and upper outer surfaces of said conduit respectively; and
   a stationary upper inner mould former means having lower edge portions slidably supported on said lower inner mould former means, said stationary upper inner mould former means being spaced apart a predetermined distance from the inner surface of said upper outer mould former means to form the upper inner surface of said conduit.

9. The apparatus according to claim 8, wherein said hopper means is adapted to deposit said mouldable conduit material exterior to said upper and lower inner mould former means as said moulding unit and said beam means are moved along said path.

10. The apparatus according to claim 8, including holding means holding the edges of said stationary upper inner mould former means in engagement with the adjacent edges of said lower inner mould former means, in an abutting relation, said holding means allowing the lower inner mould former means to be withdrawn longitudinally out of engagement with said upper inner mould former means as said moulding unit is moved along said ground path, thereby permitting said upper inner mould former means to temporarily remain in position relative to the newly formed portion of conduit unitl the upper portion of said conduit has hardened.

11. The apparatus according to claim 10, wherein said holding means includes flange means mounted on said upper inner mould former means and roller means mounted on said lower inner mould former means, said flange means bearing upon said roller means.

12. The apparatus according to claim 8, for use within a substantially channel-shaped trench wherein said ground path is the bottom portion of the trench, and wherein said moulding means includes means supporting the lower inner mould former means vertically spaced from the bottom portion of said trench a distance equal to the desired thickness of the bottom portion of the conduit wall.

13. Apparatus for moulding a continuous conduit in situ comprising:
   guideway means positionable within a longitudinally extending trench to define a guide path corresponding to the line and fall of the conduit to be formed;
   beam means mounted on said guideway means and movable longitudinally with respect thereto along the guide path such that one end of said beam means is cantilevered to overhang rearwardly of said guideway means;
   moulding means mounted on the cantilevered end of said beam means including an upper outer mould former rigidly interconnected with a lower inner mould former;
   laterally directed roller means mounted longitudinally apart on said lower inner mould former;
   upper inner mould former means mounted on said roller means such that said upper inner mould former means and said lower inner mould former define the inner wall of the conduit to be formed; and
   roller means mountable in the trench laterally adjacent said beam means, forwardly of said moulding means, supporting said upper inner mould former means forwardly of said moulding means.

14. The apparatus of claim 13, wherein said upper inner mould former means comprise a plurality of longitudinally aligned sections of like configuration.

15. The apparatus of claim 13, wherein said upper outer mould former, said upper inner mould former means and said lower inner mould former are of part circular cross-section.

16. The apparatus according to claim 13, wherein said upper outer mould former is vertically spaced apart from said upper inner mould former means a distance equal to the desired thickness of the top portion of said conduit wall.

17. The apparatus according to claim 13, wherein said moulding means further includes hopper means for receiving moulding conduit material and directiing it below said lower inner mould former and between said upper inner mould former and said upper outer mould former means, said lower inner mould former being adapted to slidably compact and finish the lower inner surface of said conduit as said apparatus is moved forwardly and conduit material is deposited between said lower inner mould former and said trench.

* * * * *

UNITED STATES PATENT OFFICE
CERTIFICATE OF CORRECTION

Patent No. 3,999,908   Dated December 28, 1976

Inventor(s) Norman A. Martin

It is certified that error appears in the above-identified patent and that said Letters Patent are hereby corrected as shown below:

Column 9, claim 8, line 33, "being" should be deleted.

Column 10, claim 17, line 56, after "former" insert -- means -- .

Column 10, claim 17, line 57, delete "means".

Signed and Sealed this

Fifth Day of April 1977

[SEAL]

Attest:

RUTH C. MASON
Attesting Officer

C. MARSHALL DANN
Commissioner of Patents and Trademarks